United States Patent
Jungbauer et al.

(10) Patent No.: US 6,664,305 B2
(45) Date of Patent: Dec. 16, 2003

(54) CHROMATOGRAPHY MATERIAL AND A PROCESS OF MANUFACTURING THAT MATERIAL

(75) Inventors: Alois Jungbauer, Vienna (AT); Rainer Hahn, Vienna (AT); Ales Podgornik, Ljubljana (SI); Milos Barut, Ljubljana (SI); Ales Strancar, Ljubljana (SI)

(73) Assignee: BIA Separations d.o.o., Ljubljana (SI)

( * ) Notice: Subject to any disclaimer, the term of this patent is extended or adjusted under 35 U.S.C. 154(b) by 0 days.

(21) Appl. No.: 10/182,768

(22) PCT Filed: Jun. 27, 2001

(86) PCT No.: PCT/EP01/07332
§ 371 (c)(1),
(2), (4) Date: Oct. 28, 2002

(87) PCT Pub. No.: WO02/00337
PCT Pub. Date: Jan. 3, 2002

(65) Prior Publication Data
US 2003/0125204 A1 Jul. 3, 2003

(30) Foreign Application Priority Data
Jun. 27, 2000 (EP) .............................. 00113550

(51) Int. Cl.[7] .................................. C08J 9/28
(52) U.S. Cl. .................. 521/64; 210/656; 210/681; 521/134; 521/139; 525/328.9; 525/329.7; 525/330.3; 525/333.3
(58) Field of Search .................. 525/328.9, 329.4, 525/329.7, 330.3, 333.3; 210/656, 681; 521/134, 139, 64

(56) References Cited

U.S. PATENT DOCUMENTS

| 5,482,996 A | 1/1996 | Russell et al. |
| 5,512,648 A | 4/1996 | Sparrow et al. |
| 5,863,551 A | 1/1999 | Woerly |

FOREIGN PATENT DOCUMENTS

| EP | 0 142 810 A2 | 5/1985 |
| EP | 0 359 996 A2 | 3/1990 |

*Primary Examiner*—Morton Foelak
(74) *Attorney, Agent, or Firm*—Jacobson Holman PLLC (57) ABSTRACT

A process of manufacturing of a chromatography material comprising the steps of

(i) reacting a polymerizable at least bifunctional monomer A with a ligand also having a functional group which binds covalently with one of the functional groups of said polymerizable bifunctional monomer A, (ii) to form a compound B comprising at least one polymerizable functional moiety (iii) polymerizing the compound B essentially alone or with the polymerizable monomers in presence of porogenes to obtain a block of porous polymerizate which is self-supporting or (iv) reacting the ligand and a spacer via a covalent bond which is cleavable to form a ligand-spacer conjugate and binding the ligand-spacer conjugate to the surface of a chromatographic support or reacting the ligand-spacer conjugate via a covalent bond to the at least bi-functional monomer A and polymerizing it essentially alone or with the polymerizable monomers in presence of porogenes to obtain a block of porous polymerizate which is self-supporting.

18 Claims, 8 Drawing Sheets

CHROMATOGRAPHY MATERIAL AND A PROCESS OF MANUFACTURING THAT MATERIAL

This is a 371 of PCT/EP01/07332 filed Jun. 27, 2001, the disclosure of which is incorporated herein by reference.

The invention concerns a process of manufacturing of a chromatography material, a material obtainable according to the process an article comprising the material as well as a use of the material.

Chromatographic methods have been employed with great success whenever mixtures of substances have to be separated. Typically, the chromatographic processes are performed on a solid matrix. The quality of the separation and the respective reliability depends on the optimum chromatographic material. Mostly, the chromatographic matrices are porous matrices. By choosing the grade of porosity and/or the chemical nature of the surface of the matrices the chromatographic processes can be influenced and tailored for the respective separation problem. For example, if affinity chromatography is performed, an affinity ligand has mostly to be immobilized at the surface of the chromatographic material. Also in catalysis performed on solid matrix the porosity and general property of the surface of the matrix is important.

In these cases, for affinity chromatographic purposes as well as for solid phase catalysis, the ligand as to be immobilized on the respective surface of the matrix. Typically, as solid matrices grained materials having a certain particle size are used. The bond between the ligand, for example the affinity ligand, and the solid matrix has to be at least as stable as that the material survives the separation conditions. Furthermore, if the immobilization of a ligand has to be performed chemically, the reaction conditions have to be chosen in such a way, that the binding properties of the ligand are not adversely affected.

For example, immobilization of polypeptides on chromatographic media happens in an undirected manner (Turková, 1978). The immobilization can only imperfectly be influenced by adjusting the reaction conditions. In the case of immobilization of polypeptides, it can mostly only until a certain degree be determined which amino acids of the proteins can be linked to the matrix via activated moieties. It often happens that the amino acids being responsible for the affinity interaction between the ligand immobilized on the surface of the matrix and the molecule to be separated are not available anymore for specific reactions. Another difficulty may arise when the active part of the ligand cannot be reached by the binding partner in the mixture to be separated. Furthermore, due to the multipoint-attachment, the three-dimensional structure of the ligand bound to the matrix may be altered in such a way that the binding pocket will be deformed so that the substance to be separated cannot bind anymore (Walters, 1985).

In general the chromatographic media are designated in "gels" no matter whether or not they are solid or soft gels or are built from materials which are completely different to the properties of a gel (for example controlled pore glass). In solid gels such as Sepharose Fast Flow (Pharmacia Biotech, Uppsala, Sweden) trisacryl (BioSepra Inc. Marlborough, USA) or Macro-prep (BioRad, Richmond, USA) the gel forming macromolecules are arranged in bundles and the arrangement interacts with the fluidum of the mixture to be separated via capillary forces. In the soft gels (the genuine gels) like dextrane or polyacrylamid the polymer interacts with the fluidum directly such as a liquid. The gel can be interpreted as forming a single phase like a dynamic liquid (Jungbauer, 1994).

Typically, the following media are used in affinity chromatography: genuine gels from dextrane, agarose and polyacrylamid; silica material and chromatographic carriers which are stabilized via a ceramic skeleton as well as so called perfusion gels which consists from coated polystyrene (Afeyan, 1990). An important criterion for a chromatographic carrier or a carrier which can be used in the solid phase catalysis is its ability to be regenerated and, of course, an unspecific absorption as small as possible. Both criteria are determined by the chemical nature of the support but also by the method of the immobilization of the ligand on the surface of the carrier material as well as the ligand itself (review for regeneration of different chromatographic supports, Jungbauer, 1994). The method of regeneration of the matrix has to consider the chemical nature of the ligand and the method how the ligand was bound to the matrix.

Basically, there can be differentiated two methods for immobilization of ligands, one for inorganic carrier materials and a method for immobilization of ligands on organic carriers. In the prior art, the immobilization of a ligand has been performed during a multistep procedure. In particular:

1. introduction of an activatable moiety in or on the matrix, if necessary. The activatable moiety is normally a hydroxyl or a carboxyl group. In most cases, the introduction of an activatable group is necessary with inorganic substrates or supports. Also an activated moiety can be introduced. When bifunctional reagents are used for the activation, the activation of the matrix and the introduction of an activated "spacer" is performed in a one-step-reaction.
2. the activation of the carrier is the first step with the most organic chromatographic substrates if no spacer is introduced with a bifunctional reagent.
3. introduction of a spacer having a reactive or activatable group. When the spacer does not have a reactive group, a second step for activation has to be performed. If bifunctional reagents are used, step 2 and step 3 are reduced to a single step.
4. coupling of the ligand and
5. blocking of the remaining reactive groups.

If a spacer is used which has two reactive groups, an activation has not to be performed. In the case of organic substrate materials, the first step can be left out since free hydroxyl groups or other activatable groups are present.

Unfortunately, during coupling of a ligand on the matrix this happens typically in such a way that it leads to an inhomogeneous distribution of the ligand on the surface of the matrix (chromatographic substrate). For example the ligand concentration decreases from the outer to the inner portions of the particulate material. In this case the ligates (the substances interacting with the ligands) are in contact with a surface covered with the ligand with a density that is too high for efficient binding. On the other hand in the inner portions of the particular material the ligand density is too low. If block-polymers are utilized the problem may arise that during the immobilization process a gradient of concentration of the ligand is established. Due to this gradient, one will find an inhomogeneous distribution. Ligands for a protein or a biopolymer are very often not available since they are immobilized at sites which are not accessible for the proteins and other biopolymers.

It is very tedious to manufacture monoliths for affinity chromatography in high quantities with a reasonable batch to batch reproducibility. Each of the preactivated monoliths must be connected to a system equipped with at least one pump to deliver the reaction solution, such as ligand mixture, each piece of monoliths must be tested individually for its functionality such as dynamic binding capacity, ligand density, leakage and/or resolution.

Therefore, it is the object of the invention to provide a process of manufacturing of a chromatography material avoiding the above mentioned drawbacks and to improve the ligand density which is necessary for an optimal separation of mixtures or conversion of substrates, and to provide a material which can be used as a chromatographic carrier or substrate for conversion of substances.

According to the invention this object is achieved by a process of manufacturing of a chromatography material comprising the steps of (i) reacting a polymerisable at least bifunctional monomer A with a ligand also having a functional group which binds covalently with one of the functional groups of said polymerisable bifunctional monomer A, (ii) to a compound B comprising at least one polymerisable functional moiety (iii) polymerizing the compound B essentially alone or with the polymerisable monomers in presence of porogenes to obtain a block of porous polymerisate which is self-supporting or (iv) reacting the ligand and a spacer via a covalent bond which is cleavable to form a ligand-spacer conjugate and binding the ligand-spacer conjugate to the surface of a chromatographic support or reacting the ligand-spacer conjugate via a covalent bond to the at least bi-functional monomer A and polymerizing it essentially alone or with the polymerisable monomers in presence of porogenes to obtain a block of porous polymerisate which is self-supporting.

According to the invention, a ligand is bound to a reactive monomer. In order to improve the accessibility of the ligand it is linked to a spacer forming a ligand spacer conjugate. This spacer can be cleaved after polymerization reaction and be removed. After forming of the polymerisate to the respective material such as particulate material or a monolithic block, the polymerisate is ready for use as separation medium, for example in affinity chromatography, in the reactive chromatography or as catalyst.

The spacer can also be bound directly to the ligand. In this case the respective derivative is bound to a conventional matrix. In this case, only at such sites ligands are immobilized which are accessible for large molecules such as proteins or other biopolymers since the ligand can only reach pores of appropriate dimension. The extension of the spacer is selected in a way depending of the extension of the biomolecule or protein to be bound on the chromatographic matrix. Also the pore sizes and the pore structures of the separation medium has to be considered.

Figure 1:
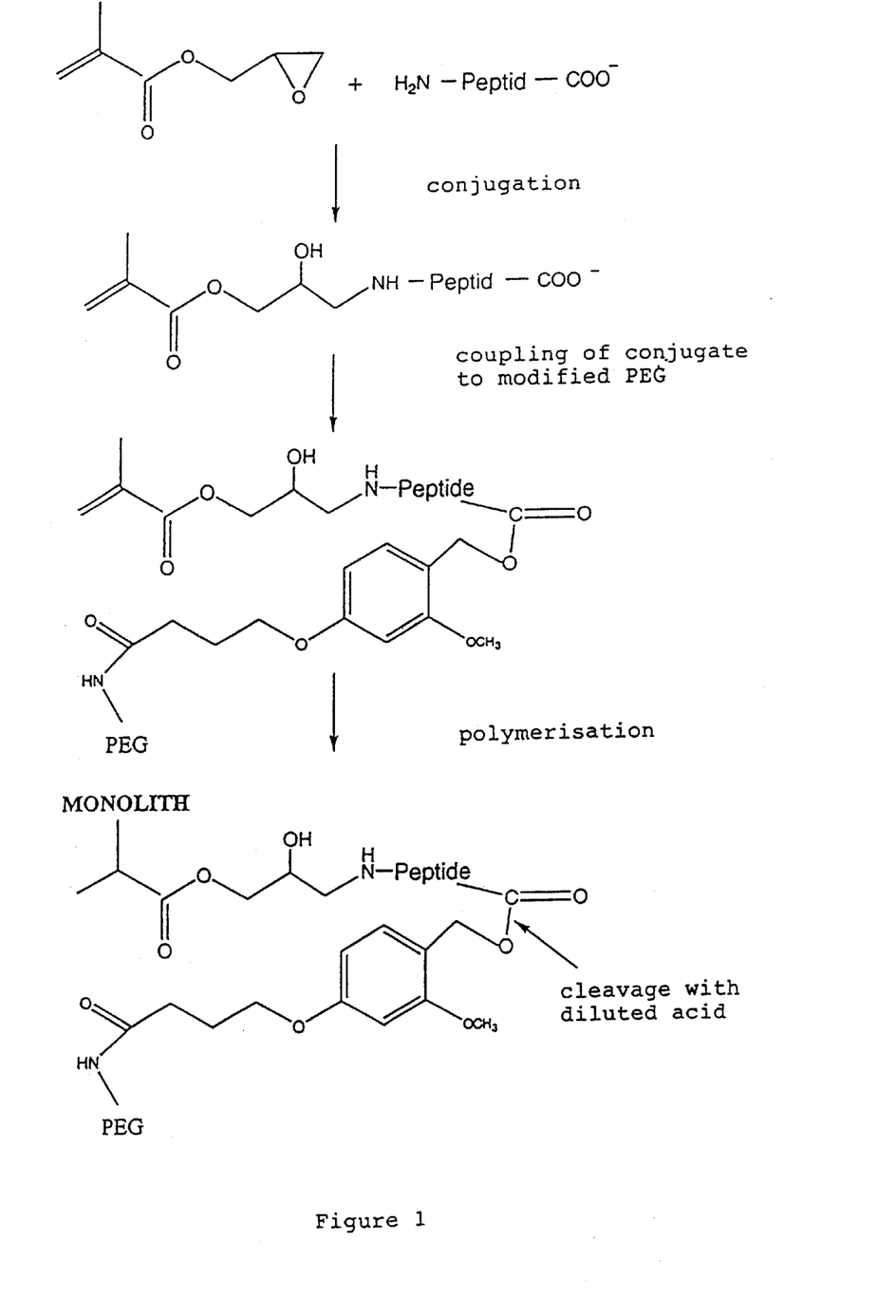

FIG. 1 shows a typical process of the invention for the manufacturing of a chromatographic material or catalyst according to the first alternative of the main claim. A ligand having an amino group of a sulfidyl group (according to FIG. 1 H$_2$N-peptide-COO$^-$) is reacted with glycidyl methacrylate and the resulting conjugate is further process after separation of byproducts. A macromolecule which does not effect the polymerization reaction (leading to a block-polymer) negatively is functionalized with a functional group. This functional group effects the reversible linkage of the macromolecule to the conjugate. According to FIG. 1, the macromolecule not interfering with the polymerization reaction is polyethylene glycol. Typically, the reaction product is purified and polymerized to a block. The macromolecule is cleaved off and removed.

The resulting material block of polymerisate can be used for affinity chromatography, reactive chromatography or catalyst.

Figure 2:
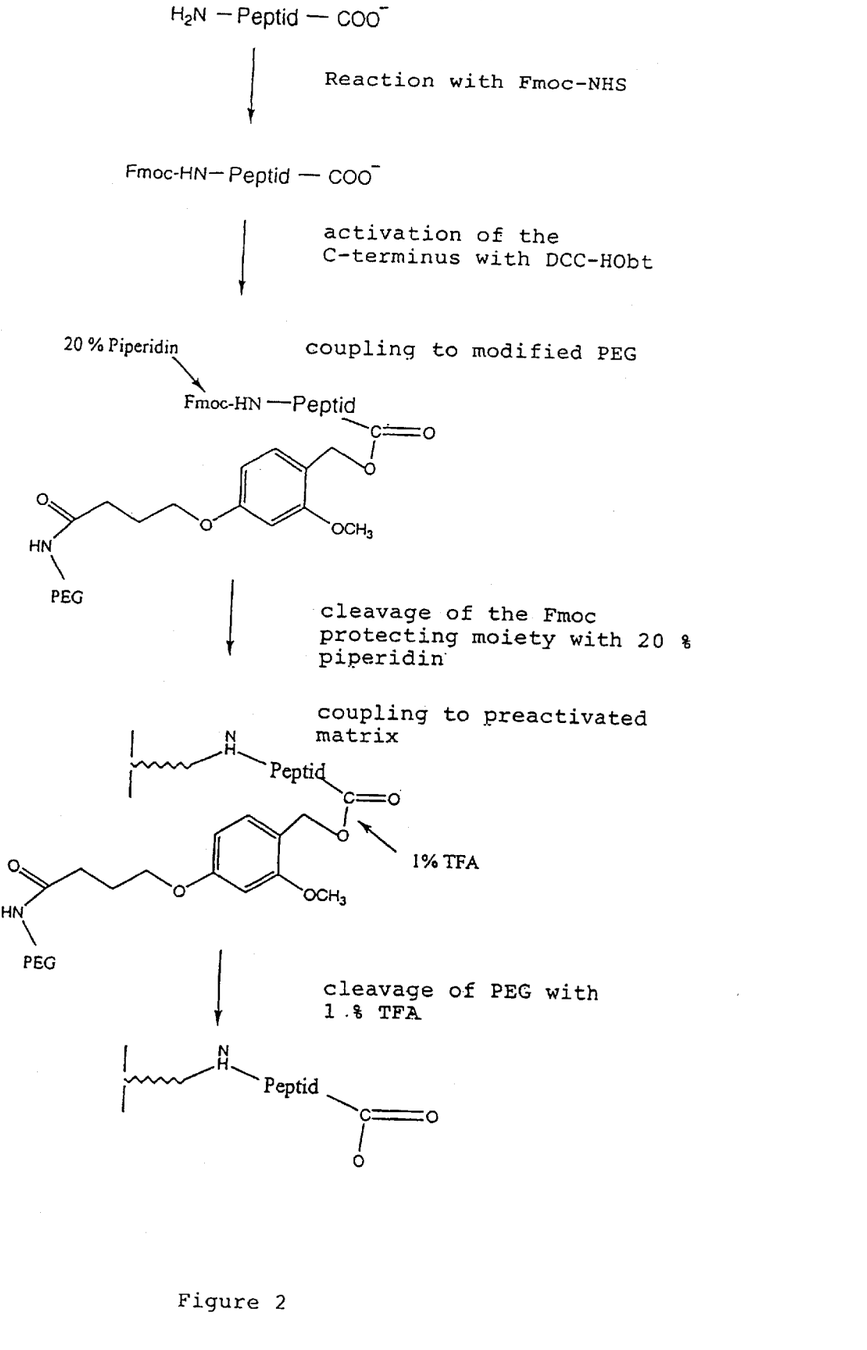

Alternatively, the ligand can be coupled to a macromolecule. This results in an increase of the molecular radius and immobilization of the macromolecule-ligand conjugate happens only at those sites which are accessible for a protein. This situation is shown in FIG. 2. A peptide ligand having an increased size due to linkage to a spacer was immobilized at the surface of a conventional matrix.

The invention provides the advantage that the ligand is only immobilized at those sites which are accessible for the ligate. Due to this the capacity is increased, difficult ligands can be utilized, the in most cases expensive ligand is saved as well as non-specific adsorption is reduced since less amount of ligand is employed.

A monomer D may be present in steps (iii) or (iv) which monomer is crosslinkable. The monomers modify the properties of the polymerisate.

In a preferred embodiment of the process of the invention at least one further monomer C is present.

Preferably, the ligand is an affinity ligand. Typically, the affinity ligand comprises biospecificity, immunoaffinity, enzyme-substrate affinity, receptor-ligand affinity or nucleotide affinity, such as hybridisation, as well as specific ionic interactions such as ion exchange interactions.

In particular, the bifunctional monomer A is glycidyl methacrylate, styrene ring substituted styrenes wherein the substitution include but is not limited to Chloromethyl, alkyl with up to 18 carbon atoms, hydroxyl, t-butyloxicarbonyl, halogen, nitro, amino group, protected hydroxyls or amino groups, vinylnaphthalene, acrylates, methacrylates, vinylacetate and pyrrolidone, and combinations thereof.

The crosslinkable co-monomer D is preferably ethylene glycol dimethacrylate, divinylbenzene, divinylnaphtalene, divinylpyridine, alkylene dimethacrylates, hydroxyalkylene dimethacrylates, hydroxyalkylene diacrylates, oligoethylene glycol diacrylates, vinyl polycarboxylic acids, divinyl ether, pentaerythritol di-,tri-, or tetra methacrylate or acrylate, trimethylopropane trimethacrylate or acrylate, alkylene bis acrylamides or methacrylamides, and mixtures of any such suitable polyvinyl monomers.

In a preferred embodiment of the process of the invention the ligand or the compound B is bound with a spacer via a covalent bond which is cleavable under reaction conditions not employed during polymerization reaction of the compound B.

The spacer is selected considering the pore size of the chromatographic material to be manufactured.

According to the invention a preferred spacer is a polyethylene glycol optionally functionalized with a group cleaveable by a dilute halogenated organic acid such as trifluor acetic acid (TFA). As cleaveable groups preferably 4-(4-Hydroxymethyl-3-methoxyphenoxy) butyric acid (HMPB), 3-(4-Hydroxymethylphenoxy) propionic acid (PAB), 3-Methoxy-4-hydroxymethylphenoxy acetic acid, 4-(2',4'-Dimethoxyphenylhydroxylmethyl) phenoxymethyl or 2-Methoxy-4-alkoxybenzyl alcohol are used.

These cleaveable groups are activated through a hydroxy group present in the cleaveable group by carbodiimides such as N,N'-dicyclohexylcarbodiimide (DCC), N,N'-diisopropylcarbodimide (DIPCDI), 1-ethyl-3-(3-dimethylaminopropyl) carbodiimide (EDC) or carbonyldiimidazole.

To this reaction mixture compounds such as 1-hydroxybenzotriazole (HOBt), benzotriazol-1-yl-oxy-tris (dimethylamino)phosphonium hexafluorophosphate (BOP), 2-(H-benzotriazol-1-yl)-1,1,3,3-tetramethyluronium tetrafluoroborate (HBTU) 2-(1H-benzotriazol-1-yl)-1,1,3,3-tetramethyluronium tetrafluoroborate (TBTU), and 2-[2-oxo-1(2H)-pyridyl]-1,1,3,3-bispenta-methyleneuronium tetrafluoroborate (TOPPipU) accelerating carbodiimide-mediated coupling are added.

In order to improve the process of the invention it is possible that the reaction product of monomer A, ligand or compound B, optionally with linked spacer is purified after reaction. It can also be advantageous that the products of the polymerization reaction after step (iii) are washed with methanol and water.

In the process of the invention typically porogenes such as dodecanol, cyclohexanol, tetradecanol, toluol, isooctanol, hexanol, methanol, ethanol, propanol, butanol or isopropanol.

A material obtainable by the process of the invention is also subject of this invention. The material of the invention can be used for chromatography, performing conversion reactions which are employing active surfaces strong acids to donate protons to a reactant and to take them back, or bases to catalyse processes including isomerization and oligomerization of olefins, reaction of olefins with aromatics, hydrogenation of polynuclear aromatics, esterification and etherification, or sulfides for weak redox reaction.

Furthermore, the material of the invention can be employed for the purification of plasma proteins, recombinant proteins, plant protein, bacterial proteins, nucleic acids such as plasmids and cosmids, peptides peptoides, oligonucleotides, oligosaccharides, polysaccharides, fatty acids, steroids.

An article comprising the material of the invention in a housing having one inlet and one outlet for liquids applied is also subject of the invention.

With the material of the invention for instance a rod shaped monolith is polymerised carrying the affinity ligand. Due to the reproducibility of the method of the invention it is sufficient to test representative samples which are tested for functionality, such as dynamic binding capacity, ligand density, leakage and/or resolution. The rod can be tailored to a desired geometry according to the requirements of the user. These pieces are mounted into a housing and are ready to use without further testing of each individual formed piece.

The invention is further explained by the following, non-limiting examples.

EXAMPLE 1

Preparation of a Conjugate and a Blockpolymer

The peptide having the amino acid sequence $NH_2$-YLSYPLTFGA (Welling, 1991) having an affinity to lysozyme was reacted with glycidyl methacrylate. The peptide was dissolved in 0.1 M sodium carbonate buffer, pH 10.0 to which 0.15 M sodium chloride was added. Thereafter, glycidyl methacrylate was added in a 100 times excess. To this reaction mixture acetonitril was added to form a homogenous solution. The reaction was performed at room temperature for at least 48 hours under vigorous stirring. Thereafter, the conjugate was purified by means of preparative reversed phase chromatography (RPC) and byproducts as well as the oligomers were removed. The RPC was performed on Nucleosil 102/5/C18, column 16 mm I.D.×250 mm. The column was conditioned with 0.1% TFA/water and after sample loading eluted within acetonitril/trifluoroacetic acid (TFA) gradient. The eluate was monitored with an UV-monitor at 214 nm. A typical chromatograph is shown in FIG. 3.

Figure 3:
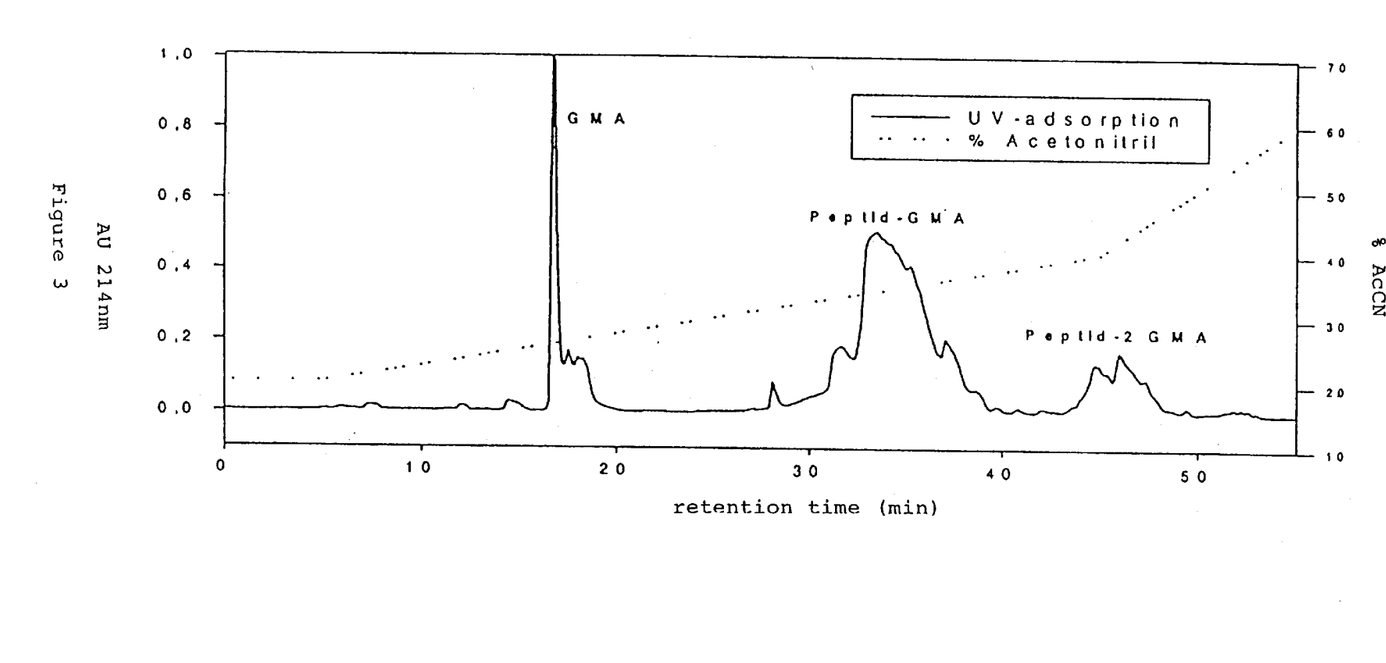
Figure 4:
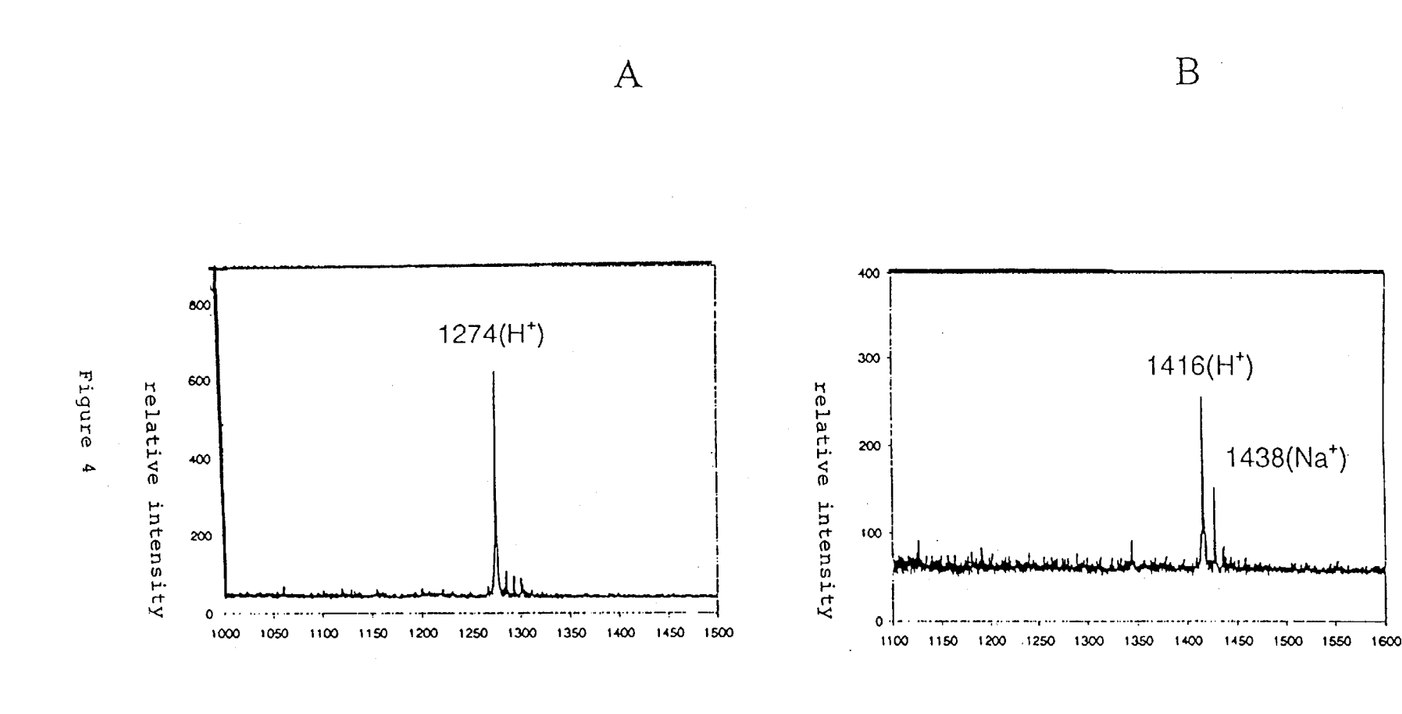

FIG. 3 shows the purification of a glycidyl methacrylate conjugate by means of reversed phase chromatography on a Nucleosil C18 column. Based on 50 mg peptide the conjugate was loaded oh the column and eluted within an acetonitril gradient. The fractions were collected and analyzed for molecular weight by means of MALDI-TOF. The respective mass spectra are shown in FIG. 4. FIG. 4a shows the peak I and 4b the peak II of FIG. 3.

The peptide used has a theoretical relative molecular mass of 1131, glycidyl methacrylate of 142.13, the conjugate consisting of 1 molecule peptide and 1 molecule methacrylate giving a theoretical relative molecular mass of 1273. When the peptide is conjugated with two molecules methacrylate the relative molecular mass is 1415. As can be derived from FIGS. 3 and 4, the conjugate of free peptide and conjugate of two methacrylate residues was separated. The pool with the single conjugate shows a molecular mass of 1274 ($H^+$). Peak II in FIG. 3 contains a substance having a relative molecular mass of 1416 ($H^+$) which is corresponding to a conjugate having two glycidyl methacrylate residues.

Fraction I is mixed with 100 ppm referred to the conjugate 2.6 Di-tert-butyl-4-methylphenol. This is advisable in order to avoid a prepolymerisation during the subsequent lyophilization. After removal of the solvent, the peptide glycidyl methacrylate conjugate is ready for polymerization.

The conjugate is polymerized in different ratios together with glycidyl methacrylate and ethylene glycol dimethacrylate at 65° C. Cyclohexanol and Dodecanol are serving as so called porogens. Benzoylperoxide is used as polymerisation initiator. The resulting reaction product is a blockpolymer. The peptide-glycidyl methacrylate conjugate is used in different concentrations by substituting the respective glycidyl methacrylate portion. Up to 25 mg conjugate per ml polymerisate were used. Thereafter, the polymer block was washed with methanol and sliced in cylindrical disks. These disks were sealed with an O-ring, and put into HPLC-cartridges. The polymerisate was tested by means of affinity chromatography. For the determination of the binding capacity a break-through curve was utilized.

EXAMPLE 2

Determination of Functionality

Figure 5:
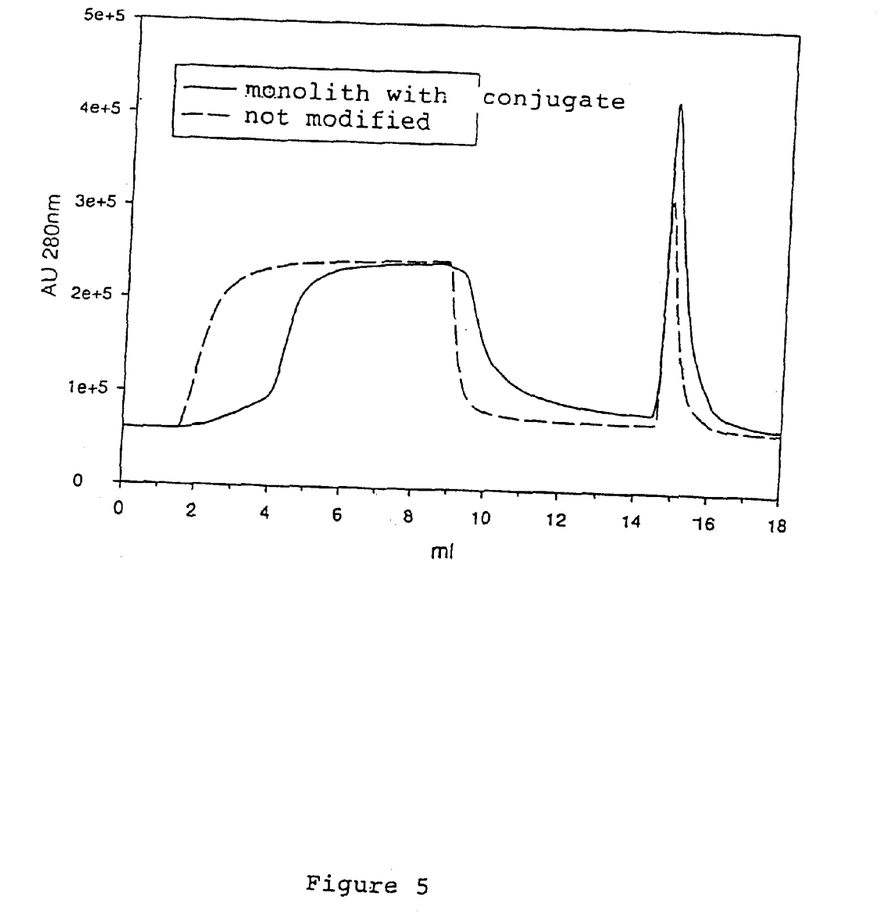

In order to test the functionality of the blockpolymer according to example 1, a break-through curve was determined using lysozyme (FIG. 5). This curve was compared with a curve of non-derivatised monoliths (blockpolymers). The monoliths were regenerated with a 1 M sodium chloride solution and, thereafter, conditioned with a 20 mM tris/HCl-buffer, pH 7.5. The polymer was loaded with lysozyme dissolved in the conditioning buffer. The concentration of lysozyme was 0.2 mg/ml, the flow rate 2 ml/min. The bed volume was 1.5 cm (330 µl). The binding capacity resulted in a value of 1.6 mg lysozyme referring to 1 ml polymer. The capacity was calculated based on the value at 10% of the maximal absorption.

EXAMPLE 3

Peptide Ligand with Spacer

The ligand or conjugate was convalently linked to a spacer. The resulting compound was blockpolymerized. The conjugate of peptide and glycidyl methacrylate was synthesized according to example 1. Then the free carboxyl group of the conjugate is activated with dicyclohexylcarbodiimide (DCC) and hydroxybenzotriazol (HBT) and linked to a modified polyethylene glycol. The modified PEG is an amino PEG derivatised with 4-hydroxy-3-methoxyphenoxybuturic acid. The activated carboxyl group of the peptide glycidyl methacrylate conjugate is covalently linked to the free hydroxyl group of the modified polyethylene glycol. This covalent bond may be cleaved in presence of a weak acid. The peptide glycidyl methacrylate-polyethylene glycol conjugate was precipitated by addition of diethylether and, thereafter, purified by means of size exclusion chromatography with a superdex 30 (Amersham-Pharmacia Biotech) column. Byproducts and excess reagents were removed. In addition, at first step FMOC-$\beta$-Alanin can be introduced in order to increase the yield of the coupling reaction. After cleavage of the FMOC moiety by means of 20% piperidin a terminal amino group is generated. The yield of the coupling reaction using an amino group instead of an OH-group is larger. After lyophilization which again is performed in the presence of 100 ppm 2,6 Di-tert-butyl-4-methylphenol, the conjugate (consisting of methacrylate residue, a peptide and polyethylene glycol as spacer) is yielding a blockpolymer.

Unreacted products and byproducts were removed and the polyethylene glycol was cleaved by reacting with 1% TFA. The cleaved PEG was washed away with methanol and 1 M sodium chloride solution. The functionality of the affinity substrate was determined by means of an affinity chromatography experiment.

EXAMPLE 4
Determination of Functionality with a Break-Through Curve

Figure 6:
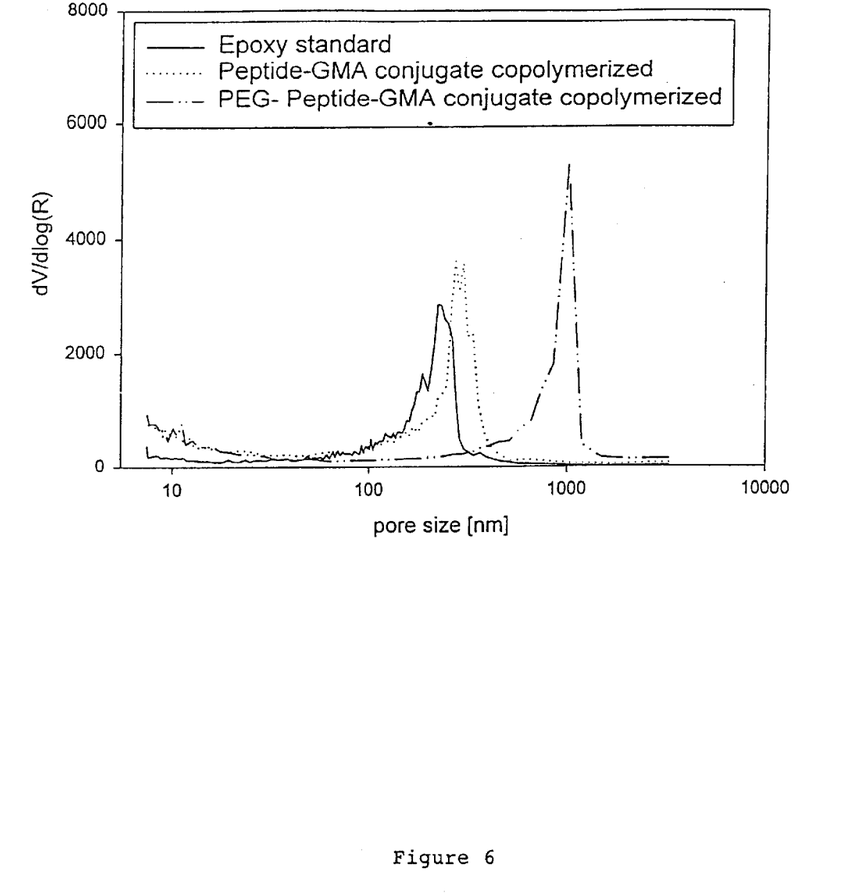

The functionality of the blockpolymer with spacer according to example was tested by frontal chromatography and breakthrough of lysozyme was used as a measure for binding capacity (FIG. 6). The breakthrough was monitored at 280 nm using a on-line UV-monitor (UV-1, Amersham-Pharmacia Biotech, Uppsala, Sweden). This breakthrough curve was compared with a curve of non-derivatised monoliths (blockpolymers). The monoliths were regenerated with a 1 M sodium chloride solution containing a 20 mM Tris/HCl-buffer, pH 7.5 conditioned with a 20 mM Tris/HCl-buffer, pH 7.5. The polymer was loaded with lysozyme dissolved in the conditioning buffer. The concentration of lysozyme was 0.2 mg/ml, the flow rate 2 ml/min. The bed volume was 1.5 cm (330 $\mu$l). The binding capacity resulted in a value of 1.0 mg lysozyme referring to 1 ml polymer. The capacity was calculated based on the value at 10% of the maximal absorption.

EXAMPLE 5
Determination of Pore Size Distribution

Pore size distribution of the material described in the examples 1 to 5 was determined with mercury porosimetry. The experiments were performed on mercury porosimetry PASCAL 440 (Porotech). The dried polymer is suspended in liquid mercury. The volume of the intruded mercury is a direct measure for the penetrated pore volume. In FIG. 6, the pore size distribution of monoliths according to the invention is shown. As reference a CIM-expoxy material from BIA Separations, Ljubljana (Slovenia) was used. The pore size distribution of the material made with the conjugate is significantly higher and therefore easier accessible than the conventional material used as a reference.

EXAMPLE 6
Immobilization of a Peptide Synthetic Polymer Conjugate on a Conventional Substrate The peptide of example 1 is dissolved in a sodium chloride buffer, pH 5.0 having 20% acetonitril. The N-terminal of the peptide is blocked with fluorenyl-methyl-oxycarbonyl-N-hydroxy-succinimide. Then the N-terminal blocked peptide is purified by removing excess fluorenyl-methyl-oxycarbonyl-N-hydroxy-succinimide by means of reversed phase chromatography followed by activation of the C-terminus with dicyclohexylcarbodiimide and HBT under addition of triethylamine for a time period of 2 hours. The activated peptide is reacted at room temperature and stirring with the derivatized polyethylene glycol. After 20 hours, the reaction is finalized, the FMOC group cleaved by piperidin and the peptide-polyethylene-glycol-conjugate is precipitated with diethyl ether. To 1 ml reaction solution 3 ml diethyl ether is added and further purified with size exclusion chromatography. The purified conjugate having a free N-terminus is immobilized on an epoxy activated matrix at pH 10 in aqueous sodium chloride buffer during a time period of 48 hours. The PEG is cleaved by addition of 1% TFA for 1 hour. Thereafter, the affinity column is thoroughly washed with aqueous sodium chloride buffer.

EXAMPLE 7
Determination of Functionality with a Breakthrough Curve

Figure 7:
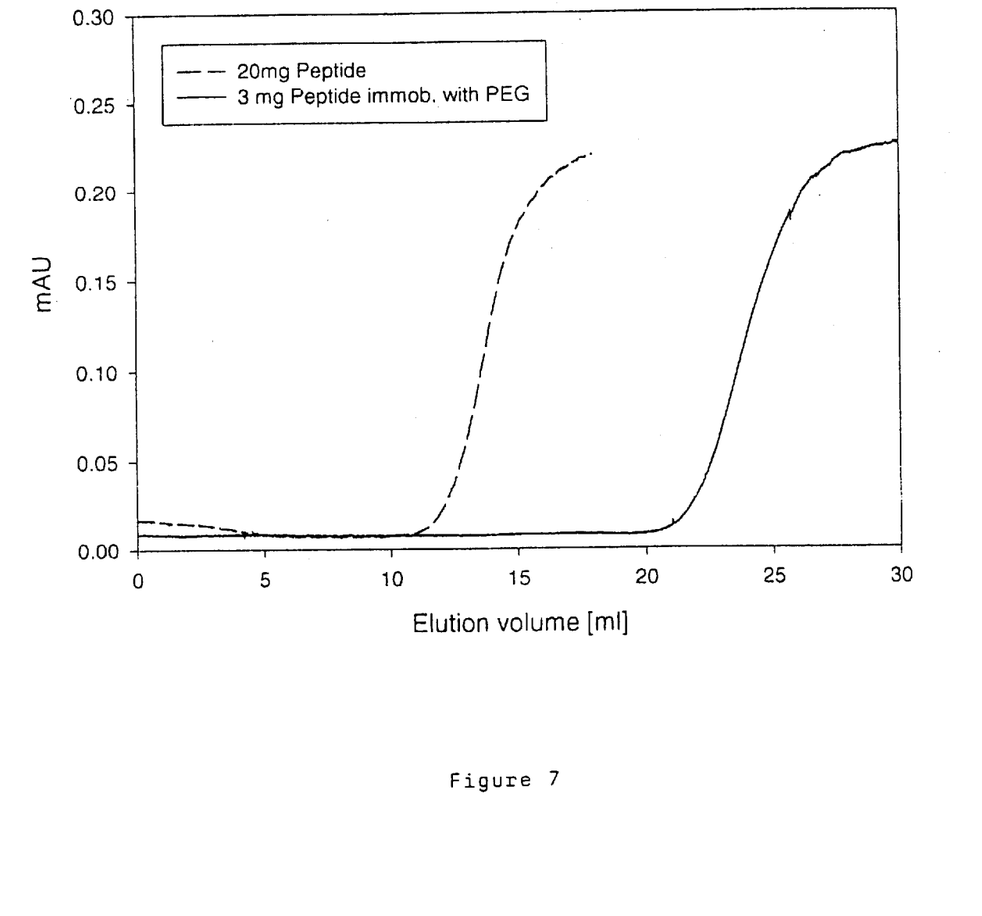

The gel with the immobilized peptide of example 6 was packed into a HR 5 column (Amersham Pharmacia Biotech, Uppsala, Sweden). The gel was then equilibrated with a 20 mM Tris/HCL-buffer, pH 7.5 and then loaded with lysozyme dissolved in the equilibration buffer. The concentration was 0.1 mg/ml and the flow rate 0.33 ml/min. The binding capacity was calculated with 5.5 mg/ml gel. The capacity was compared with a gel where 20 mg of the peptide were immobilized in a conventional way on the same type of material. In this case the capacity was only 2.7 mg/ml gel (FIG. 7).

EXAMPLE 8
Site-Directed Immobilization of a Peptide Synthetic Polymer Conjugate with Protecting Groups on a Conventional Substrate The peptide with the sequence $H_2N$-EYKSWEYC-COOH, which binds coagulation F VIII (Amatscheck et al.) is synthesized with Fmoc chemistry. The lysine side chain is protected with 4,4-(dimethyl-2,6-dioxocyclohexylidene)-ethyl protecting group (Dde). Cystein is protected with the t-Butylthio protecting group. The full protected peptide is cleaved off the resin with 1% TFA. The Dde protecting group is removed by treatment with hydrazin. The reaction mixture is purified by a gel filtration step and the purified peptide is activated with dicyclohesylcarbodiimide and HOBt according to example 6. The peptide is then reacted at room temperature and stirring with the derivatized polyethylenglycol. After 20 hours the peptide-polyethylenglycol-conjugate is precipitated with diethyl ether, dissolved in water and purified with a gel filtration step. The purified conjugate, with the free amino group of the lysine side chain is then reacted with an epoxy activated matrix. After 48 hours of reaction the remaining protecting groups are removed by treatment with 20% piperidin to remove the Fmoc group and then 100% TFA to remove other protecting groups and to cleave off the polyethylenglycol from the immobilized peptide.

Figure 8:
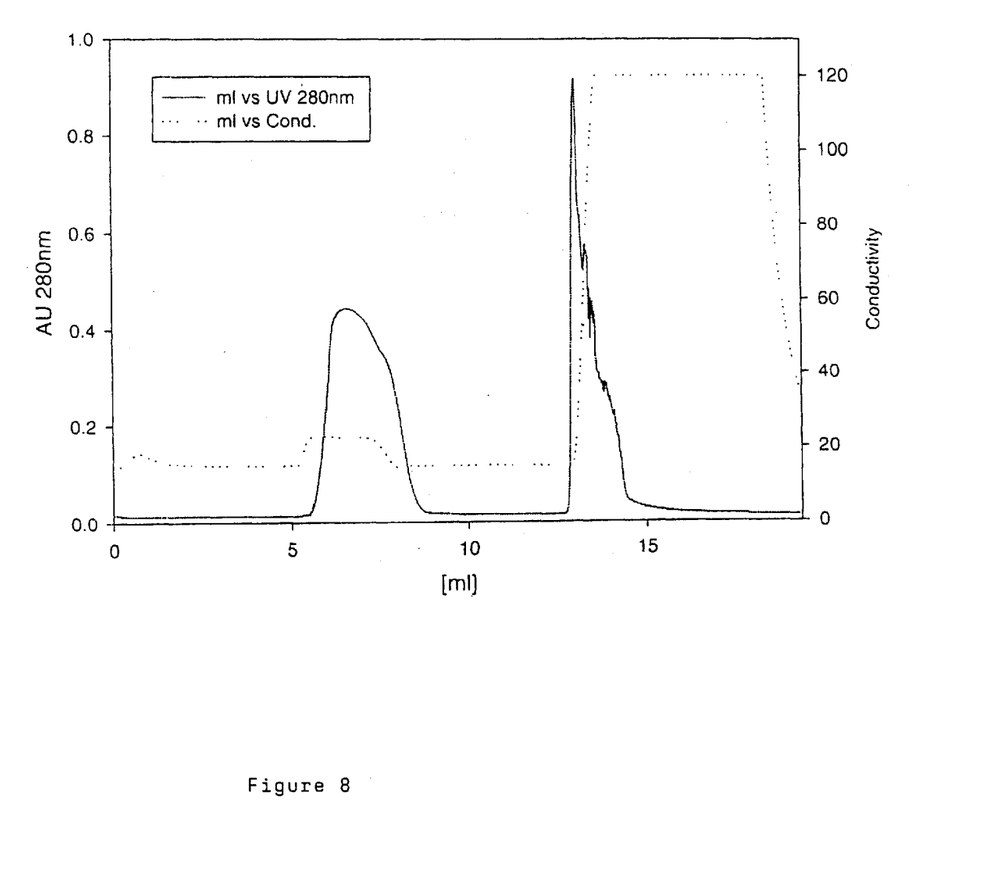

The functionality of the chromatography is tested with a pre-purified F VIII preparate. F VIII binds specifically to the peptide, impurities can be detected in the unbound fraction (FIG. 8).

LIST OF REFERENCES

1. Afeyan, N. B., Gordon, N. F., Mazsaroff, I., Varady, L., Fulton, S. P., Yang, Y. B. and Regnier, F. E. (1990) Flow-though particles for the high-performance liquid chromatographic separation of biomolecules: perfusion chromatography Journal of Chromatography, 519, 1–29.
2. Jungbauer, A. and Boschetti, E. (1994) Manufacture of recombinant proteins with safe and validated chromatographic sorbents Journal of Chromatography. B, Biomedical Applications, 662, 143–79.
3. Turkova, J. (1978) Affinity Chromatography. Elsevier, Amsterdam, N.Y.
4. Walters, R. R. (1985) Affinity chromatography Analytical Chemistry, 57, 1099A–1101A.
5. Welling, G. W., van Gorkum, J., Damof, R. A., Drijfhout, J. W., Bloemhoff, W. and Welling-Wester, S. (1991) A ten-residue fragment of an antibody (mini-antibody) directed against lysozyme as ligand in immunoaffinity chromatography Journal of Chromatography, 548, 235–42.

What is claimed is:

1. A process of manufacturing of a chromatography material comprising the steps of
    (i) reacting a polymerisable at least bifunctional monomer A with a ligand also having a functional group which binds covalently with one of the functional groups of said polymerisable bifunctional monomer A,
    (ii) to form a compound B comprising at least one polymerisable functional moiety
    (iii) polymerizing the compound B essentially alone or with the polymerisable monomers in presence of porogenes to obtain a block of porous polymerisate which is self-supporting or
    (iv) reacting the ligand and a spacer via a covalent bond which is cleavable to form a ligand-spacer conjugate and binding the ligand-spacer conjugate to the surface of a chromatographic support or reacting the ligand-spacer conjugate via a covalent bond to the at least bifunctional monomer A and polymerizing it essentially alone or with the polymerisable monomers in presence of porogenes to obtain a block of porous polymerisate which is self-supporting.

2. The process of claim 1 wherein in steps (iii) or (iv) a monomer D is present which is crosslinkable.

3. The process of claim 1 additionally providing at least one further monomer C.

4. The process of claim 3 wherein the ligand is an affinity ligand.

5. The process of claim 4 wherein the affinity ligand comprises biospecificity, immunoaffinity, enzyme-substrate affinity, receptor-ligand affinity or nucleotide affinity, such as hybridisation.

6. The process of claim 3 wherein the affinity ligand comprises specific ionic interactions such as ion exchange interactions.

7. The process of claim 1 wherein the bifunctional monomer A is glycidyl methacrylate, styrene ring substituted styrenes wherein the substitution including but not limited to Chloromethyl, alkyl with up to 18 carbon atoms, hydroxyl, t-butyloxicarbonyl, halogen, nitro, amino group, protected hydroxyls or amino groups, vinylnaphthalene, acrylates, methacrylates, vinylacetate and pyrrolidone, and combinations thereof.

8. The process of claim 2 wherein the crosslinkable comonomer D is ethylene glycol dimethacrylate, divinylbenzene, divinylnaphtalene, divinylpyridine, alkylene dimethacrylates, hydroxyalkylene dimethacrylates, hydroxyalkylene diacrylates, oligoethylene glycol diacrylates, vinyl polycarboxylic acids, divinyl ether, pentaerythritol di-, tri-, or tetra methacrylate or acrylate, trimethylopropane trimethacrylate or acrylate, alkylene bis acrylamides or methacrylamides, and combinations of any such suitable polyvinyl monomers.

9. The process of claim 1, wherein the ligand or the compound B is bound with a spacer via a covalent bond which is cleavable under reaction conditions not employed during polymerization reaction of the compound B.

10. The process of claim 1, wherein the spacer is selected considering the pore size of the chromatographic material to be manufactured.

11. The process of claim 9 wherein the spacer is a polyethlene glycol optionally functionalized with a group cleaveable by a dilute halogenated organic acid such as trifluor acetic acid (TFA). As cleaveable groups preferably 4-(4-Hydroxymethyl-3-methoxyphenoxy) butyric acid (HMPB), 3-(4-Hydroxymethylphenoxy) propionic acid (PAB), 3-Methoxy-4-hydroxymethylphenoxy acetic acid, 4-(2',4'-Dimethoxyphenylhydroxylmethyl) phenoxymethyl or 2-Methoxy-4-alkoxybenzyl alcohol are used.

12. The process of claim 1 wherein the reaction product of monomer A with a ligand to form compound B, optionally with linked spacer, is purified after reaction.

13. The process of claim 1 wherein the products of the polymerization reaction after step (iii) are purified.

14. The process of claim 1 wherein porogenes are selected from the group consisting of dodecanol, cyclohexanol, tetradecanol, toluol, isooctanol, hexanol, methanol, ethanol, propanol, butanol or isopropanol.

15. A material obtainable according to claim 1.

16. An article comprising the material of claim 15 in a housing having one inlet and one outlet for liquids to be applied.

17. Method of using the material according to claim 15 for chromatography and performing conversion reactions which are employing active surfaces strong acids to donate protons to a reactant and to take them back, or bases to catalyse processes including isomerization and oligomerization of olefins, reaction of olefins with aromatics, hydrogenation of polynuclear aromatics, esterification and etherification, or sulfides for weak redox reaction.

18. Method of using the material according to claim 15 for the purification of recombinant proteins, immunglobulins, antibodies, plasma proteins, in particular proteins involved in the blood clotting cascade such as clotting factors and/or inhibitors.

* * * * *